(12) United States Patent
Manning et al.

(10) Patent No.: US 11,906,480 B2
(45) Date of Patent: Feb. 20, 2024

(54) STRESSED ROCK PERFORATING-CHARGE TESTING SYSTEM

(71) Applicant: Halliburton Energy Services, Inc., Houston, TX (US)

(72) Inventors: John Douglas Manning, Alvarado, TX (US); Brenden Michael Grove, Mansfield, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 768 days.

(21) Appl. No.: 17/043,916

(22) PCT Filed: Aug. 1, 2018

(86) PCT No.: PCT/US2018/044837
§ 371 (c)(1),
(2) Date: Sep. 30, 2020

(87) PCT Pub. No.: WO2020/027830
PCT Pub. Date: Feb. 6, 2020

(65) Prior Publication Data
US 2021/0018411 A1 Jan. 21, 2021

(51) Int. Cl.
*G01N 3/12* (2006.01)
*E21B 43/117* (2006.01)

(52) U.S. Cl.
CPC .............. *G01N 3/12* (2013.01); *E21B 43/117* (2013.01); *G01N 2203/0232* (2013.01)

(58) Field of Classification Search
CPC .... G01N 3/12; G01N 3/10; G01N 2203/0232; G01N 2203/0256; E21B 43/117
See application file for complete search history.

(56) References Cited

U.S. PATENT DOCUMENTS

| 4,932,239 A | 6/1990 | Regalbuto |
| 8,627,707 B2 | 1/2014 | Hardesty et al. |
| 9,718,245 B2 | 8/2017 | Jang |
| (Continued) | | |

FOREIGN PATENT DOCUMENTS

| CA | 2716097 | 8/2014 |
| IN | 220531 | 7/2008 |
| WO | 2018132105 | 7/2018 |

OTHER PUBLICATIONS

International Application No. PCT/US2018/044837, International Search Report and Written Opinion, dated Apr. 26, 2019, 13 pages.

*Primary Examiner* — Suman K Nath
(74) *Attorney, Agent, or Firm* — Kilpatrick Townsend & Stockton LLP

(57) ABSTRACT

Shaped charges used in wellbore perforating operations may be tested using a stressed rock perforating-charge testing system. The system includes a shaped charge testing chamber. The shaped charge testing chamber may include a loading and ejection piston and a core sample chamber. The core sample chamber is in mechanical communication with the loading and ejection piston and is sized to receive a core sample. The shaped charge testing chamber also includes a core sample stress applicator to apply stress to the core sample. Further, the system includes an ejection mechanism adjacent to the shaped charge testing chamber to provide an ejecting force on the loading and ejection piston.

19 Claims, 6 Drawing Sheets

(56) References Cited

U.S. PATENT DOCUMENTS

| | | |
|---|---|---|
| 2013/0312510 A1 | 11/2013 | Brooks et al. |
| 2014/0122035 A1 | 5/2014 | Dean et al. |
| 2016/0319995 A1 | 11/2016 | Hobbs |
| 2019/0331570 A1* | 10/2019 | Liu .......................... G01N 3/12 |
| 2020/0003751 A1* | 1/2020 | Li ........................ G01N 33/383 |

* cited by examiner

STRESSED ROCK PERFORATING-CHARGE TESTING SYSTEM

TECHNICAL FIELD

The present disclosure relates to devices used to test shaped charges of downhole perforating gun assemblies. More specifically, this disclosure relates to a testing device that maintains core samples under stress during a testing operation of the shaped charges.

BACKGROUND

In oilfield services operations, perforating guns are used to perforate wellbore casings, cement sheaths, a formation surrounding the wellbore, or any combination thereof. Perforation of the wellbore components may prepare an oil and gas well for production. For example, perforating guns may be used to achieve fluid communication between a reservoir of the formation and the wellbore. In addition, the perforating guns may be used to generate perforations in the formation surrounding the wellbore that are used in hydraulic fracturing, acidizing, or other wellbore stimulation activities.

Shaped charges of the perforating guns may be tested in a laboratory environment to determine an effectiveness of the shaped charges. For example, the shaped charges may be positioned and discharged adjacent to a sample of cylindrical cement. As the sample of cement is not tested under stress (e.g., is not pressurized to match formation stress) and the sample of cement does not have the same material composition as a core sample, the shaped charge may perform differently in a testing environment than in a downhole environment. Accordingly, shaped charge testing results may be skewed based on the material that is actually tested in the laboratory environment.

DETAILED DESCRIPTION

Certain aspects and examples of the disclosure relate to a stressed rock perforating-charge testing system with increased testing accuracy by testing core samples under stress and by providing core sample ejection mechanisms that enable efficient system resets between tests.

A stressed rock perforating-charge testing system may be used to test how a shaped charge of a perforating gun will interact with a formation surrounding a wellbore. In some examples, the stressed rock perforating-charge testing system places a core sample under stress prior to testing the stressed rock. Results of testing the core samples in the stressed rock perforating-charge testing system may provide an indication of how effective a perforating gun equipped with the shaped charge under test will be within the wellbore.

The perforating-charge testing system may include a core sample ejection mechanism and a quick release mechanism that enable efficient system resets between tests. In some examples, the core sample ejection mechanism may be an elevator system located adjacent to a shaped charge testing chamber. The core sample ejection mechanism may elevate the core sample or core sample chamber out of the shaped charge testing chamber for ease of removal.

Additionally, the quick release mechanism may work in conjunction with the core sample ejection mechanism. For example, the quick release mechanism may open the shaped charge testing chamber prior to operation of the core sample ejection mechanism. In this manner, the quick release mechanism may remove any force that maintains the core sample or core sample chamber in a testing position.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
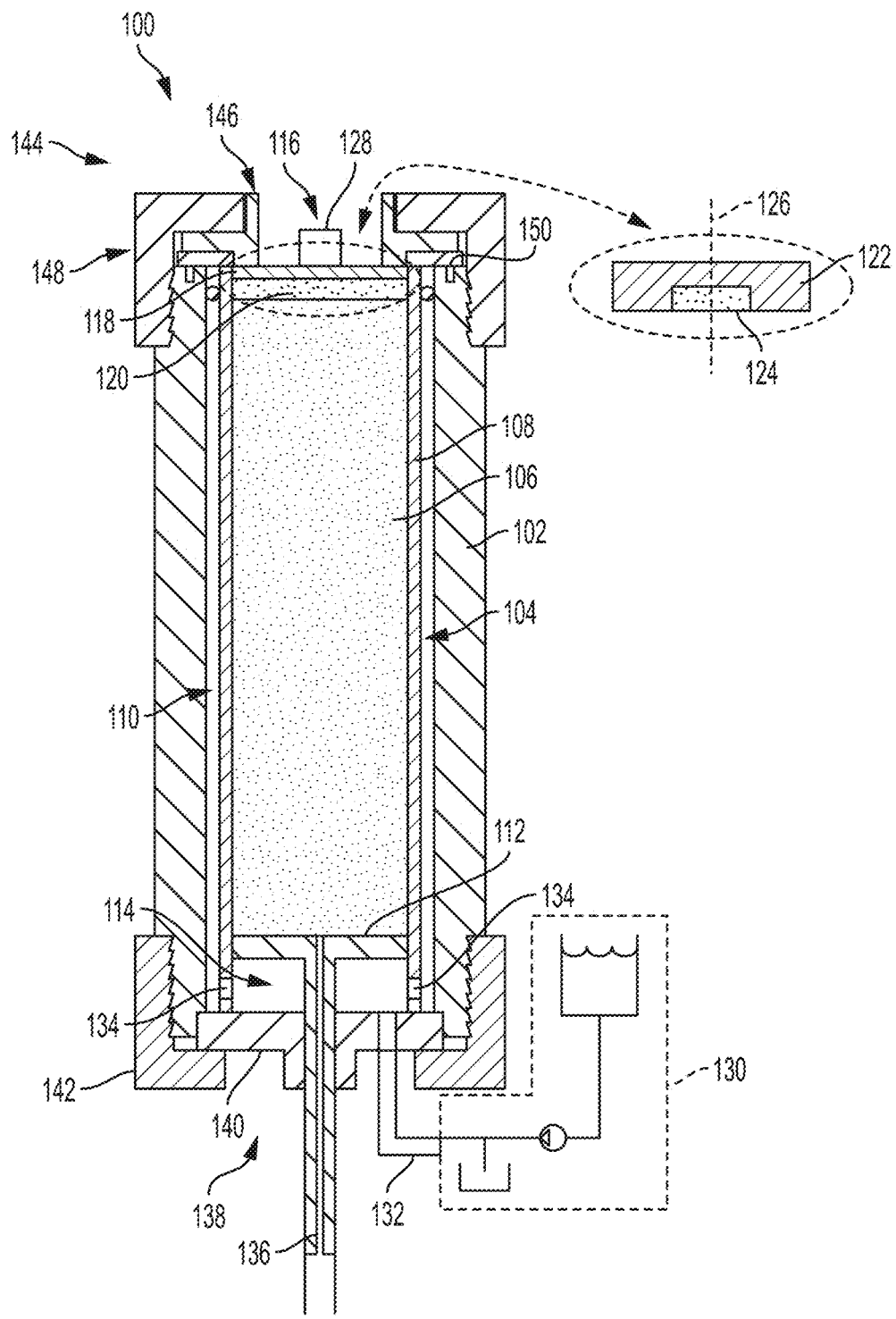
FIG. 1 is a cross-sectional view of an example of a stressed rock perforating-charge testing system according to some aspects of the present disclosure.

FIG. 1 is a cross-sectional view of an example of a stressed rock perforating-charge testing system 100 according to some aspects. The testing system 100 includes a shaped charge testing chamber 102. A core sample chamber 104 may be positioned within the shaped charge testing chamber 102.

The core sample chamber 104 includes a core sample 106 positioned within a confining sleeve 108. The confining sleeve 108 may be made from a non-porous and pliable material (e.g., rubber). Pressure may be applied to the confining sleeve 108 from pressurized fluid within an annulus 110 to place to the core sample 106 under stress. Pressure may also be applied to the core sample 106 by a loading an ejection piston 112, which is in mechanical communication with the core sample chamber 104, from the pressurized fluid within a pressurization chamber 114. In an embodiment, the stress placed on the core sample 106 may be similar to formation stress of a formation surrounding a wellbore. Accordingly, the core sample 106 under stress may react to a shaped charge in a similar manner to the formation surrounding a wellbore.

In one or more embodiments, the core sample 106 may have a diameter of 7 inches. In other embodiments, the diameter of the core sample 106 may be increased or decreased. For example, a diameter larger than 7 inches may be used to test a large shaped charge. Additionally, a diameter smaller than 7 inches may be used for a number of reasons including to reduce testing costs, based on material availability, etc. Further, a length of the core sample 106 may vary based on testing parameters and cost. For example, a core sample 106 may be 24 or 30 inches long, and the core sample 106 may also be longer or shorter depending on a distance the shaped charge is expected to tunnel into the core sample 106.

Positioned adjacent to a testing location 116 is a casing plate 118. A cement plate 120 may also be positioned between the casing plate 118 and the core sample 106. The casing plate 118, which may be made from steel, the cement plate 120, and the core sample 106 may represent the layers through which the shaped charges under test penetrate when the shaped charges are deployed downhole in a wellbore as part of a perforating gun. In one or more embodiments, the casing plate 118 and the cement plate 120 may be replaced by a coupon retainer 122 made from steel and a coupon 124 made from cement. The combination of the coupon retainer 122 and the coupon 124 provide a similar structure to the casing plate 118 and the cement plate 120 for the shaped charge to penetrate. In other embodiments, the coupon retainer 122 may include a circular hole surrounding an axis 126, and the coupon 124 may include a steel layer and a cement layer. In such an embodiment, the coupon 124 provides a similar structure to the casing plate 118 and the cement plate 120 for the shaped charge to penetrate.

The testing location 116 may represent a portion of the testing system 100 at which a charge sub-assembly 128 is placed during testing. Any charge sub-assembly may be used in the testing location 116. For example, the charge sub-assembly 128 may include a detonator, a length of detonation cord, a shaped charge, and any configuration of gun tubes, scallop plates, and spacers depending on how the shaped charges are tested in the testing system 100.

The testing system 100 may include a core sample stress applicator 130. The stress applicator 130 may be a pressurized fluid pump that provides pressurized fluid to an inlet 132 of the shaped charge testing chamber 102. Pressurized fluid may travel from the inlet 132 to a pressurization chamber 114 and to the annulus 110 via through ports 134. The pressurized fluid applies pressure on the confining sleeve 108 and the loading and ejection piston 112. In turn, the confining sleeve 108 and the loading and ejection piston 112 provide pressure on the core sample 106 to place the core sample 106 under stress for testing. The pressurized fluid may operate at up to 12,000 pounds per square inch (psi) or greater. A vent hole 136 in fluid communication with the core sample 106 may provide a path for excess fluids (e.g., an air gap between the core sample 106 and the confining sleeve 108, or pore fluid squeezed out of pore spaces from within the core sample 106) to exit the core sample chamber 104 while under stress.

To maintain the pressure of the pressurized fluid within the shaped charge testing chamber 102, the shaped charge testing chamber 102 is sealed at both ends. For example, a non-testing end 138 of the testing system 100 includes an enclosure 140 and a retaining nut 142. The enclosure 140 may form fluid pressure tight seals with the confining sleeve 108 and the testing chamber 102 when the retaining nut 142 is secured to the testing chamber 102. A testing end 144 of the testing system 100 includes a retaining ring 146 and a retaining nut 148. The retaining ring 146 may form fluid pressure tight seals between the testing chamber 102, the confining sleeve 108, and the casing plate 118 or the coupon retainer 122 when the retaining nut 148 is secured to the testing chamber 102.

Further, when the retaining nut 148 is removed from the testing chamber 102 (e.g., when the testing system 100 is reset), a thin retaining plate 150 positioned between the confining sleeve 108 and the testing chamber 102 may maintain fluid in the annulus 110 and the pressurization chamber 114. In this manner, the core sample 106 may be removed and replaced without draining the fluid within the annulus 110 and the pressurization chamber 114. In such an embodiment, the confining sleeve 108 may remain fixed within the shaped charge testing chamber 102 during insertion and removal of the core sample 106. Avoiding drainage of the fluid may increase efficiency of resetting the testing system 100 by eliminating initial fill time associated with filling the annulus 110 and the pressurization chamber 114 upon replacing the core sample 106.

Figure 2:
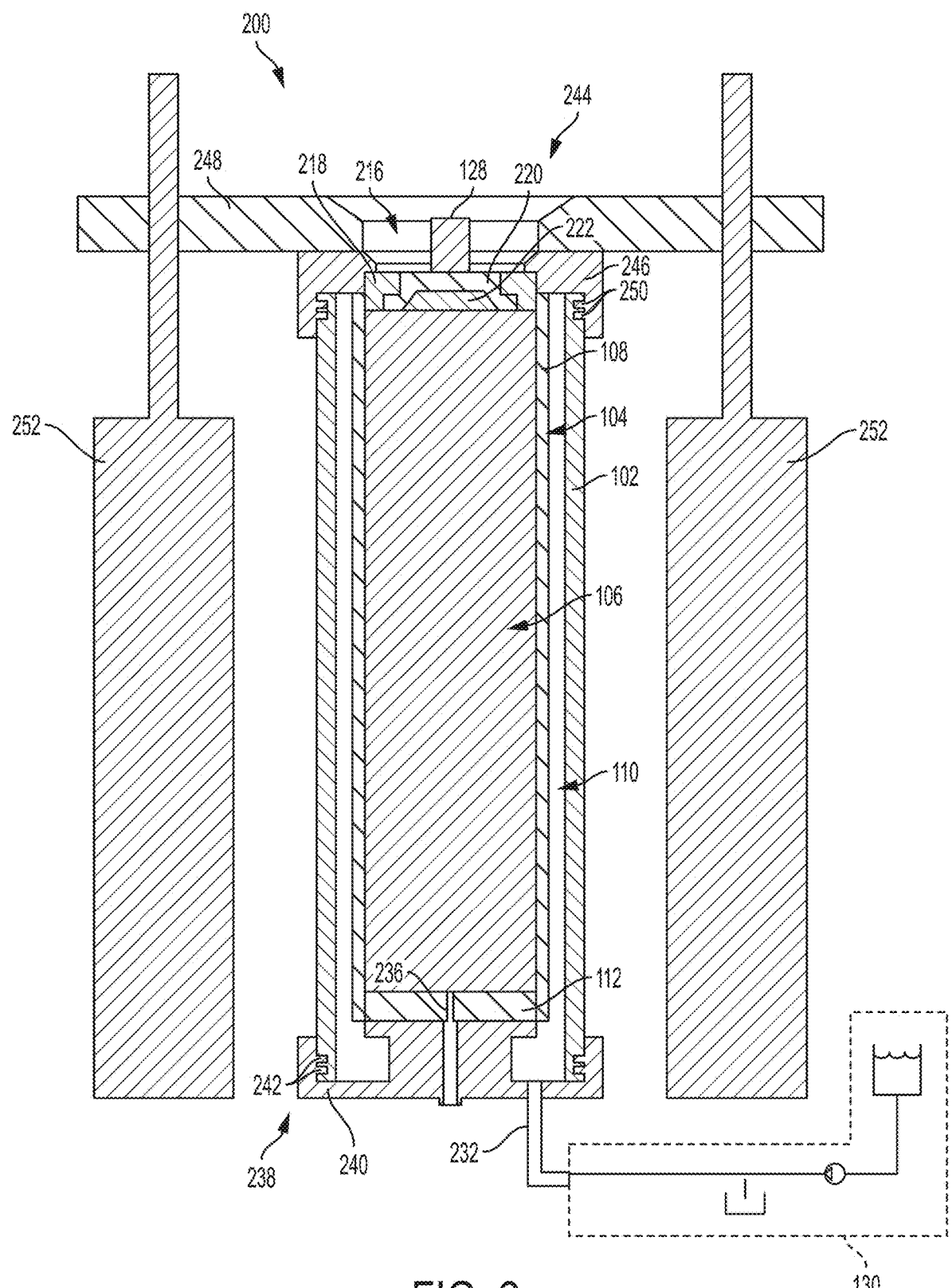
FIG. 2 is a cross-sectional view of an additional example of a stressed rock perforating-charge testing system according to some aspects of the present disclosure.

Turning to FIG. 2, a cross-sectional view of an example of a stressed rock perforating-charge testing system 200 is illustrated. The testing system 200 includes the shaped charge testing chamber 102. Similar to the testing system 100, a core sample chamber 104 may be positioned within the shaped charge testing chamber 102.

The core sample chamber 104 includes a core sample 106 positioned within a confining sleeve 108. The confining sleeve 108 may be made from a non-porous and pliable material (e.g., rubber). Pressure may be applied to the confining sleeve 108 from pressurized fluid within an annulus 110 to place to the core sample 106 under stress. Pressure may also be applied to the core sample 106 by a loading and ejection piston 112. In one or more examples, the loading and ejection piston 112 may be a stationary component (e.g., a fixed piston or endplate) that does not provide any ejection force or pressure on the core sample 106 (e.g., an ejection mechanism is not coupled to the loading and ejection piston 112). In such an example, the loading and ejection piston 112 provides a stationary backing for the core sample 106 when the core sample 106 is enclosed within the testing system 200. In an embodiment, the stress placed on the core sample 106 may be similar to formation stress of a formation surrounding a wellbore. Accordingly, the core sample 106 under stress may react to a shaped charge in a similar manner to the formation surrounding a wellbore.

Positioned adjacent to a testing location 216 is a coupon retainer 218. The coupon retainer 218 maintains a casing coupon 220 and a cement coupon 222. The casing coupon 220, which may be made from steel, the cement coupon 222, and the core sample 106 may represent the layers through which the shaped charges under test would penetrate when the shaped charges are deployed downhole in a wellbore as part of a perforating gun. In one or more embodiments, casing coupon 220 and the cement coupon 222 may be replaced by casing and cement plates, as discussed above with respect to FIG. 1. Other shapes and sizes of the casing coupon 220 and the cement coupon 222 are contemplated within the scope of the present disclosure.

The testing location 216 may represent a portion of the testing system 200 at which a charge sub-assembly 128 is placed during testing. Similar to the testing system 100, any charge sub-assembly may be used in the testing location 216. The charge sub-assembly 128 may include a detonator, a length of detonation cord, a shaped charge, and any configuration of gun tubes, scallop plates, and spacers depending on how the shaped charges are tested in the testing system 200.

The testing system 200 may include a core sample stress applicator 130. The stress applicator 130 may be a pressurized fluid pump that provides pressurized fluid to an inlet 232 of the shaped charge testing chamber 102. Pressurized fluid may travel from the inlet 232 to the annulus 110. In some embodiments, the pressurized fluid may also provide pressure on the loading and ejection piston 112 to provide additional pressure on the core sample 106. The pressurized fluid applies pressure on the confining sleeve 108 and the loading and ejection piston 112, and the confining sleeve 108 and the loading and ejection piston 112 provide pressure on the core sample 106 to place the core sample 106 under stress during testing. The pressurized fluid may operate at up to 12,000 pounds per square inch (psi) or greater. A vent hole 236 in fluid communication with the core sample 106 may provide a path for excess fluids (e.g., an air gap between the core sample 106 and the confining sleeve 108, or pore fluid squeezed out of pore space within the core sample 106) to exit the core sample chamber 104 while under stress.

To maintain the pressure of the pressurized fluid within the shaped charge testing chamber 102 of the testing system 200, the shaped charge testing chamber 102 is sealed at both ends. For example, a non-testing end 238 of the testing system 200 includes vessel cap 240. A pair of toric joints 242 (e.g., an o-ring or any other sealing mechanism) may be disposed between the vessel cap 240 and the core chamber 102 to maintain a fluid pressure tight seal between the vessel cap 240 and the core chamber 102. A testing end 244 of the testing system 200 includes a vessel cap 246 coupled to a yoke 248. The vessel cap 246 may form a fluid pressure tight seal with the testing chamber 102 using toric joints 250 such that pressurized fluid is maintained in the annulus 110. Additionally, the vessel cap 246 maintains a seal with the coupon retainer 218 and the confining sleeve 108. To maintain the seal with testing chamber 102, the coupon retainer 218, and the confining sleeve 108, the yoke 248 is controlled by hydraulic cylinders 252. The hydraulic cylinders 252 lower the yoke 248 and the vessel cap 246 into a testing position, as illustrated, with a force that maintains the air tight seals to keep the pressurized fluid within the annulus 110. The combination of the yoke 248, the vessel cap 246, and the hydraulic cylinders 252 may be referred to as a hydraulic yoke. When testing of a particular shaped charge is complete, or when an initial core sample 106 is loaded into the testing system 200, the hydraulic cylinders 252 raise the yoke 248 and the vessel cap 246 such that a new core sample 106 may be positioned within the testing system 200.

In an embodiment, the core sample chamber 104 is removable from the shaped charge testing chamber 102. For example, the core sample chamber 104 may include the core sample 106, the confining sleeve 108, and the loading and ejection piston 112. In one or more embodiments, the core sample chamber 104 may also include the coupon retainer 218, the casing coupon 220, and the cement coupon 222. Other configurations of the core sample chamber 104 are also contemplated. The core sample chamber 104 may be assembled for testing remote from the testing system 200. Accordingly, upon completion of a shaped charge test, the core sample chamber 104 within the shaped charge testing chamber 102 may be removed and replaced with a preassembled and untested core sample chamber 104 for subsequent testing. In an embodiment, at least a portion of the yoke 248 may be detached from one or all of the hydraulic cylinders 252 such that the yoke 248 is movable to a position that does not interfere with the loading or unloading of the core sample chamber 104. In other embodiments, the yoke 248 may be raised to a position sufficiently above the shaped charge testing chamber 102 such that the yoke 248 does not interfere with the loading or unloading of the core sample chamber 104.

In one or more embodiments, the core sample chamber 104 may be loaded and unloaded at the non-testing end 238 of the testing system 200. For example, the yoke 248 may couple to the vessel cap 240, and the core sample chamber 104 and/or the core sample 106 may be loaded into the testing system 200 from the non-testing end 238 when the yoke and vessel cap 240 are moved away from the non-testing end 238. In such an embodiment, the vessel cap 246 may be stationary as the core sample chamber 104 and/or the core sample 106 are removed and replaced.

Figure 3:
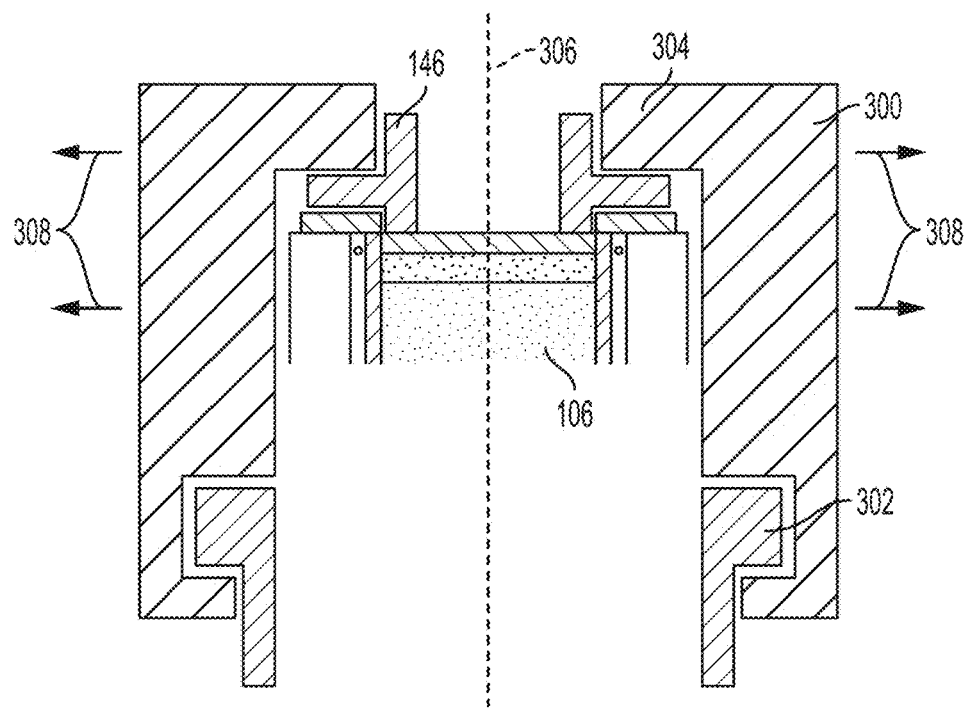
FIG. 3 is a cross-sectional view of a clamshell assembly of a stressed rock perforating-charge testing system according to some aspects of the present disclosure.

FIG. 3 is a cross-sectional view of a clamshell assembly 300 of a stressed rock perforating-charge testing system 100 according to some aspects. To provide greater efficiency with the removal of the core sample 106. The clamshell assembly 300 may couple to the testing system 100 by fitting around a flange 302 of the testing system 100. A lip 304 of the clamshell assembly 300 may be positioned over the retaining ring 146 to maintain the core sample 106, the casing plate 118, and the cement plate 120 in a testing position during operation of the testing system 100.

The clamshell assembly 300 may be removed from the testing system 100 to replace the core sample 106, the casing plate 118, and the cement plate 120. Removal of the clamshell assembly 300 involves movement of the clamshell assembly 300 away from an axis 306 of the testing system 100. This movement of the clamshell assembly 300 is indicated by direction arrows 308.

Figure 4:
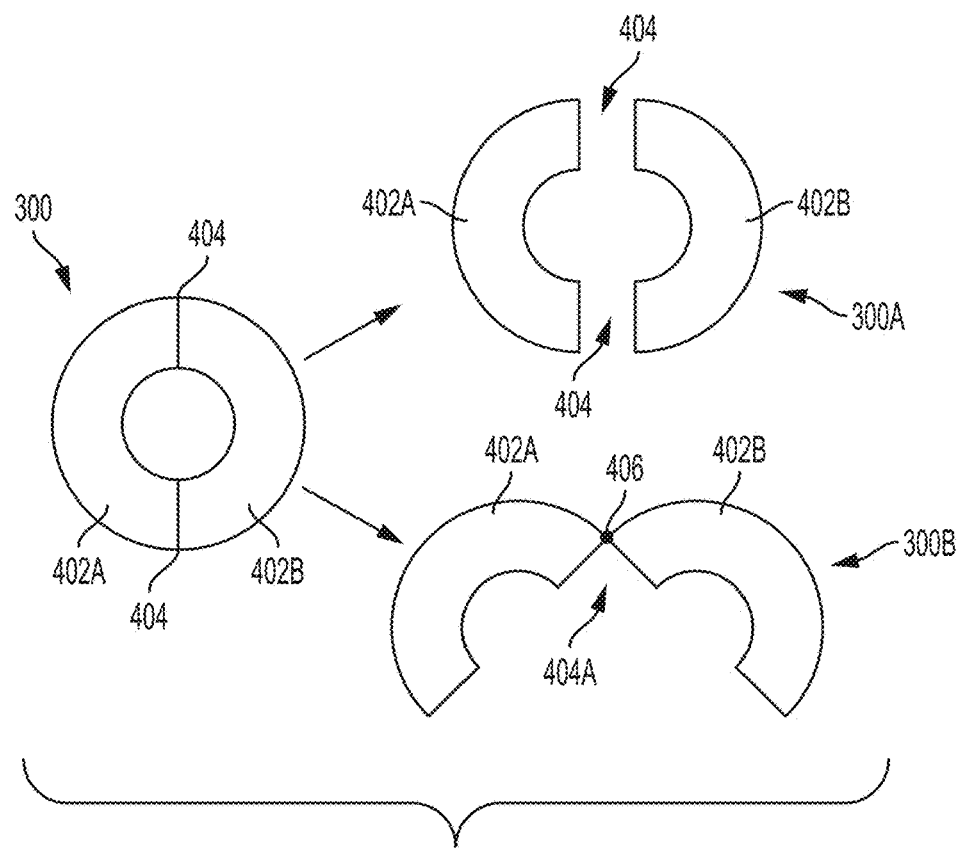
FIG. 4 is a top view of an operation of the clamshell assembly of FIG. 3 according to some aspects of the present disclosure.

FIG. 4 is an overhead view of an operation of the clamshell assembly 300 according to some aspects. As illustrated, the clamshell assembly 300 includes a first section 402A and a second section 402B. The first and second sections 402A and 402B are separated by seams 404. In an embodiment, the seams 404 separate the first and second sections 402A and 402B, as shown in the clamshell assembly 300A. In another embodiment, a hinge 406 connects one seam 404A such that the two sections 402A and 402B are coupled at the hinge 406, as in the clamshell assembly 300B. Accordingly, the clamshell assembly 300B opens by pivoting around the hinge 406. In any embodiment, the two sections 402A and 402B may be held together during a shaped charge testing operation using bands or other fasteners at the seams 404.

Figure 5:
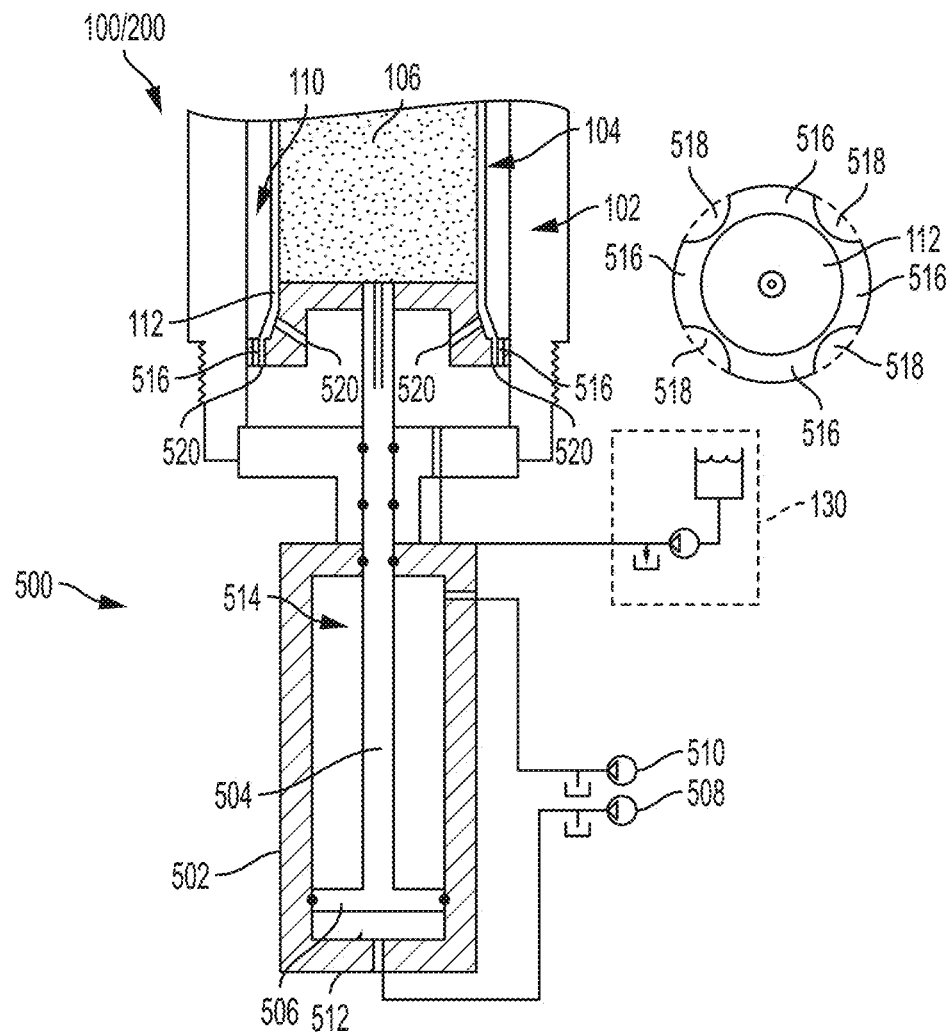
FIG. 5 is a cross-sectional view of a base of an example of a stressed rock perforating-charge testing system with an ejection mechanism according to some aspects of the present disclosure.

FIG. 5 is a cross-sectional view of a base (e.g., a non-testing end 138/238) of an example of a stressed rock perforating-charge testing system 100/200 with an ejection mechanism 500 according to some aspects. The ejection mechanism 500 includes a housing 502 and an actuator 504. The ejection mechanism 500 may be positioned adjacent to the testing system 100/200, and the actuator 504 may be mechanically coupled to the loading and ejection piston 112 of the testing system 100/200.

The actuator 504 includes a piston 506 that is movable by an ejection pump 508 and a retraction pump 510. While the actuator 504 is depicted with both the ejection pump 508 and the retraction pump 510, other embodiments may include a single pump and valving that performs both ejection and retraction of the actuator 504. In the illustrated example, the ejection pump 508 supplies a fluid to a chamber 512 to push the actuator 504 in a direction toward the testing system 100/200. By pushing the actuator 504 toward the testing system 100/200, the core sample 106, the core sample chamber 104, or both are pushed toward an opening of the testing system 100/200 during resetting of the testing system 100/200 between shaped charge tests. In this manner, the ejection mechanism 500 provides an ejecting force on the core sample 106, the core sample chamber 104, or both.

The retraction pump 510 supplies a fluid to a chamber 514 to push the actuator 504 in a direction away from the testing system 100/200. By pushing the actuator 504 away from the testing system 100/200, a new core sample 106 or core sample chamber 104 is returned to a testing position within the shaped charge testing chamber 102. While the ejection mechanism 500 is described as a mechanism relying on fluid pressure differentials for movement (e.g., a hydraulic system or a pneumatic system), other ejection mechanisms are also contemplated within the scope of the disclosure. For example, the ejection mechanism 500 may also be powered by a motor or any other mechanical or electric actuators.

In the illustrated embodiment, the loading and ejection piston 112 may include guiding mechanisms 516 that guide the core sample chamber 104 within the shaped charge testing chamber 102 as the core sample chamber 104 is ejected and retracted. For example, the guiding mechanisms 516 provide a self-guiding effect on the loading and ejection piston 112 such that the loading and ejection piston 112 is maintained in a central orientation with respect to an inner diameter of the shaped charge testing chamber 102.

The guiding mechanisms 516 may be positioned around a circumference of the loading and ejection piston 112 such that spaces 518 are also positioned around the circumference to enable a flow of pressurized fluid from the stress applicator 130 into the annulus 110 between the core sample chamber 104 and the shaped charge testing chamber 102. In an embodiment, through ports 520 may also be formed in the loading and ejection piston 112 to enable the flow of pressurized fluid into the annulus 110. Other arrangements of guiding mechanisms 516, spaces 518, and through ports 520 that provide stabilization of the core sample chamber 104 during ejection and retraction while enabling flow of pressurized fluid around the guiding mechanisms 516 are also contemplated.

Figure 6:
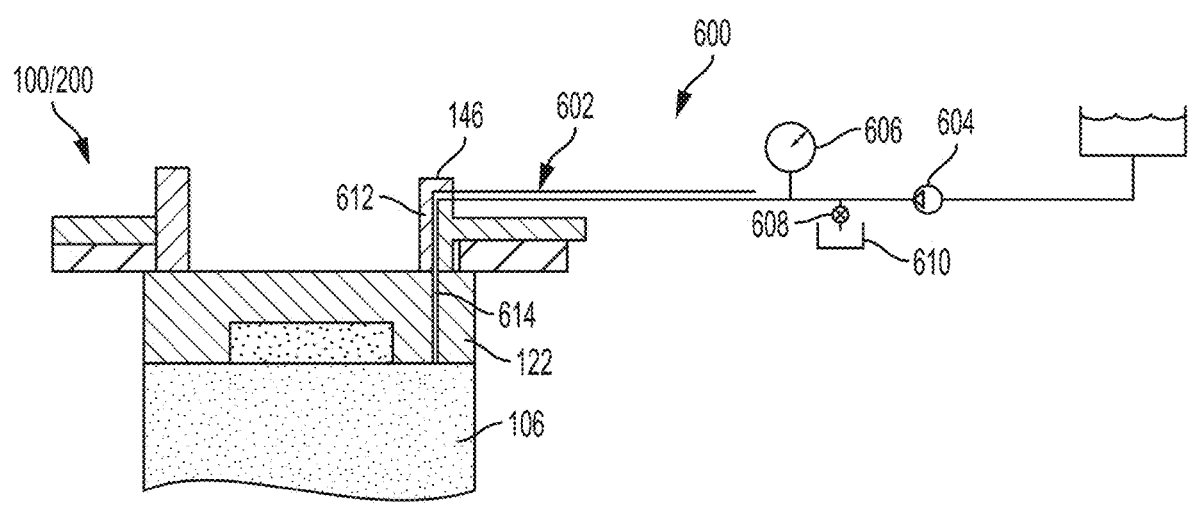
FIG. 6 is a cross-sectional view of portion of a stressed rock perforating-charge testing system with a pore fluid pressurization mechanism according to some aspects of the present disclosure.

FIG. 6 is a cross-sectional view of portion of a stressed rock perforating-charge testing system 100/200 with a pore fluid pressurization mechanism 600 according to some aspects. The pore fluid pressurization mechanism 600 includes a pressure line 602 that receives pressurized fluid from a pump 604. The pressure of the pressurized fluid may be monitored by a pressure gauge 606, and the pressurization mechanism 600 may include a dump valve 608 and vent 610 to relieve pressure on the pressure line 602 when the testing system 100/200 completes a testing operation on a core sample 106.

The pressure line 602 may run into a port 612 within the retaining ring 146. The port 612 may be in fluid communication with a port 614 of the coupon retainer 122, and the port 614 provides the pressurized fluid to the core sample 106. By providing the pressurized fluid to the core sample 106, the pore fluid pressurization mechanism 600 provides pressurization of fluid within the pores of the core sample 106. Further, the pressurized fluid provided to the core sample 106 may be a fluid that matches fluid within the pores of the core sample 106. For example, the pressurized fluid may be oil, nitrogen, water, or any other pore fluid that may be present in a formation surrounding a wellbore. Pressurizing the pores of the core sample 106 may provide further accuracy to the shaped charge testing by accounting for the additional environmental factor (i.e., pore pressurization) of a formation under stress.

Figure 7:
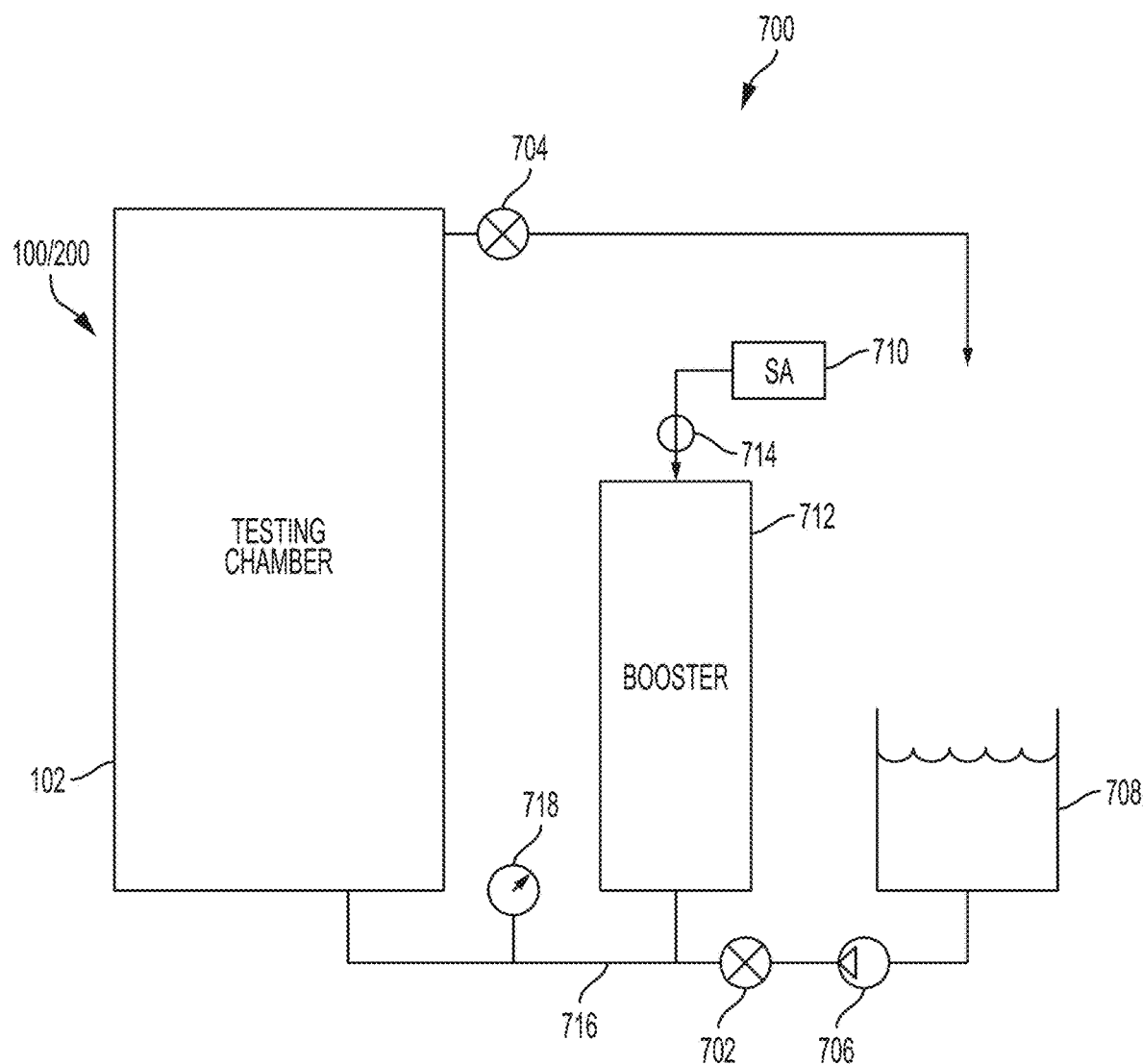
FIG. 7 is a schematic representation of a rapid pressurization system of a stressed rock perforating-charge testing system according to some aspects of the present disclosure.

FIG. 7 is a schematic representation of a rapid pressurization system 700 of a stressed rock perforating-charge testing system 100/200 according to some aspects. The rapid pressurization system 700, which may be used as the stress applicator 130, provides a mechanism to efficiently pressurize the shaped charge testing chamber 102 to place the core sample 106 under stress. During operation, the shaped charge testing chamber 102 may be sealed, and valves 702 and 704 may be opened to begin a rapid pressurization process. A pump 706, which may be a low-pressure pump, begins pumping to fill the shaped charge testing chamber 102 with a confining fluid (e.g., water) from a confining fluid reservoir 708. As the confining fluid fills the shaped charge testing chamber 102, air is purged from the system through the valve 704. In one or more embodiments, the shaped charge testing chamber 102 may already be filled with confining fluid from prior shaped charge testing operations. In such embodiments, the pump 706 may remain off until additional confining fluid is needed within the shaped charge testing chamber 102.

When the shaped charge testing chamber 102 is filled, the valves 702 and 704 are closed to maintain a confining fluid level within the shaped charge testing chamber 102. Additionally, the pump 706 stops pumping the confining fluid from the confining fluid reservoir 708. To bring the confining fluid within the shaped charge testing chamber 102 up to a pressure used to place a core sample 106 under stress, shop air 710, or another low-pressure liquid, is provided to a pressure booster 712 by way of a regulator 714. The application of boosted pressure from the pressure booster 712 to a high pressure line 716 enables control of the confining fluid pressure within the shaped charge testing chamber 102. In an example, a piston or diaphragm within the pressure booster 712 separates the shop air 710, or other low-pressure liquid, from the confining fluid within the high pressure line 716. For example, a pressure gauge 718 may be monitored, and the regulator 714 may be adjusted based on readings of the pressure gauge 718 to maintain a desired confining fluid pressure within the shaped charge testing chamber 102. In one or more embodiments, adjustment of the regulator 714 may be performed automatically by a computing device that monitors the pressure gauge 718.

When the shaped charge testing chamber 102 reaches and maintains the desired pressure of the confining fluid, a shaped charge testing operation occurs (e.g., a shaped charge directed toward the core sample 106 is detonated). Upon completion of the shaped charge testing, the confining fluid within the high pressure line 716 is vented to depressurize the confining fluid within the shaped charge testing chamber 102. Upon depressurization of the confining fluid, the core sample 106 and/or the core sample chamber 104 may be removed and replaced for subsequent shaped charge testing.

In some aspects, systems, devices, and methods for testing shaped charges under stress are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a stressed rock perforating-charge testing system, the system comprising: a shaped charge testing chamber comprising: a loading and ejection piston; a core sample chamber in mechanical communication with the loading and ejection piston and size to receive a core sample; and a core sample stress applicator to apply stress to the core sample; and an ejection mechanism adjacent to the shaped charge testing chamber to provide an ejecting force on the loading and ejection piston.

Example 2 is the system of example 1, further comprising: a hydraulic yoke to maintain the core sample chamber in a testing position within the shaped charge testing chamber.

Example 3 is the system of examples 1-2, wherein the hydraulic yoke comprises: a yoke; a vessel cap coupled to the yoke to form a seal over the core sample chamber; and at least one hydraulic cylinder coupled to the yoke to provide pressure to maintain the removable core sample chamber in the testing position within the shaped charge testing chamber.

Example 4 is the system of examples 1-3, comprising: a clamshell assembly to maintain the core sample chamber in a testing position within the shaped charge testing chamber.

Example 5 is the system of example 4, wherein the clamshell assembly comprises two clamshell sections coupled by a hinge.

Example 6 is the system of examples 1-5, wherein the core sample chamber comprises a confining sleeve that remains fixed within the shaped charge testing chamber during insertion and removal of the core sample.

Example 7 is the system of examples 1-6, wherein the ejection mechanism ejects and retracts the loading and ejection piston using fluid pressure differentials from a hydraulic system or a pneumatic system.

Example 8 is the system of examples 1-7, wherein the core sample chamber is removable from the shaped charge testing chamber.

Example 9 is the system of examples 1-8, wherein the core sample stress applicator fills the shaped charge testing chamber with a fluid and pressurizes the fluid using a pressure booster.

Example 10 is the system of examples 1-9, wherein the loading and ejection piston comprises a guiding mechanism to guide the loading and ejection piston along an inner diameter of the shaped charge testing chamber.

Example 11 is the system of examples 1-10, further comprising: a pore fluid pressurization mechanism to pressurize fluid located within pores of the core sample.

Example 12 is a stressed rock perforating-charge testing device, comprising: a shaped charge testing chamber; a removable core sample chamber positionable within the shaped charge testing chamber and sized to receive a core sample; a core sample stress applicator to apply stress to the core sample; and a hydraulic yoke to maintain the removable core sample chamber in a testing position within the shaped charge testing chamber.

Example 13 is the device of example 12, wherein the hydraulic yoke comprises: a yoke; a vessel cap coupled to the yoke to form a seal over the removable core sample chamber; and at least one hydraulic cylinder coupled to the yoke to provide pressure to maintain the removable core sample chamber in the testing position within the shaped charge testing chamber.

Example 14 is the device of examples 12-13, comprising: an ejection mechanism to provide an ejection force on the removable core sample chamber to push the removable core sample chamber in a direction toward the hydraulic yoke.

Example 15 is the device of example 14, wherein the ejection mechanism is positioned adjacent to the shaped charge testing chamber.

Example 16 is the device of examples 12-15, wherein the core sample stress applicator fills the shaped charge testing chamber with a fluid and pressurizes the fluid using a pressure booster.

Example 17 is the device of examples 12-16, wherein the core sample stress applicator applies pressure up to 12,000 psi on the core sample.

Example 18 is a stressed rock perforating-charge testing system, comprising: a shaped charge testing chamber; a core sample chamber positionable within the shaped charge testing chamber and sized to receive a core sample; a core sample stress applicator to apply stress to the core sample; a hydraulic yoke that to maintain the core sample chamber in a testing position within the shaped charge testing chamber; a loading and ejection piston in mechanical communication with the core sample chamber; and an ejection mechanism adjacent to the shaped charge testing chamber to provide an ejecting force on the loading and ejection piston.

Example 19 is the system of example 18, wherein the core sample chamber is removable from the shaped charge testing chamber.

Example 20 is the system of examples 18-19, wherein the core sample chamber comprises a rubber confining sleeve.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
 a shaped charge testing chamber comprising:
  a loading and ejection piston;
  a core sample chamber in mechanical communication with the loading and ejection piston and size to receive a core sample; and
  a core sample stress applicator to apply stress to the core sample; and
 an ejection mechanism adjacent to the shaped charge testing chamber to provide an ejecting force on the loading and ejection piston; and
 a device comprising a hydraulic yoke for maintaining the core sample chamber in a testing position, wherein the hydraulic yoke comprises at least one hydraulic cylinder to provide pressure to maintain the core sample chamber in the testing position within the shaped charge testing chamber.

2. The system of claim 1, wherein the hydraulic yoke comprises:
 a yoke;
 a vessel cap coupled to the yoke to form a seal over the core sample chamber; and
 at least one hydraulic cylinder coupled to the yoke to provide pressure to maintain the core sample chamber in the testing position within the shaped charge testing chamber.

3. The system of claim 1, wherein the device comprises a clamshell assembly
 to maintain the core sample chamber in a testing position within the shaped charge testing chamber.

4. The system of claim 3, wherein the clamshell assembly comprises two clamshell sections coupled by a hinge.

5. The system of claim 1, wherein the core sample chamber comprises a confining sleeve that remains fixed within the shaped charge testing chamber during insertion and removal of the core sample.

6. The system of claim 1, wherein the ejection mechanism ejects and retracts the loading and ejection piston using fluid pressure differentials from a hydraulic system or a pneumatic system.

7. The system of claim 1, wherein the core sample chamber is removable from the shaped charge testing chamber.

8. The system of claim 1, wherein the core sample stress applicator fills the shaped charge testing chamber with a fluid and pressurizes the fluid using a pressure booster.

9. The system of claim 1, wherein the loading and ejection piston comprises a guiding mechanism to guide the loading and ejection piston along an inner diameter of the shaped charge testing chamber.

10. The system of claim 1, further comprising:
a pore fluid pressurization mechanism to pressurize fluid located within pores of the core sample.

11. A device comprising:
a shaped charge testing chamber;
a removable core sample chamber positionable within the shaped charge testing chamber and sized to receive a core sample;
a core sample stress applicator to apply stress to the core sample; and
a device comprising a hydraulic yoke to maintain the removable core sample chamber in a testing position within the shaped charge testing chamber, wherein the hydraulic yoke comprises at least one hydraulic cylinder to provide pressure to maintain the removable core sample chamber in the testing position within the shaped charge testing chamber.

12. The device of claim 11, wherein the hydraulic yoke comprises:
a yoke; and
a vessel cap coupled to the yoke to form a seal over the removable core sample chamber.

13. The device of claim 11, comprising:
an ejection mechanism to provide an ejection force on the removable core sample chamber to push the removable core sample chamber in a direction toward the hydraulic yoke.

14. The device of claim 13, wherein the ejection mechanism is positioned adjacent to the shaped charge testing chamber.

15. The device of claim 11, wherein the core sample stress applicator fills the shaped charge testing chamber with a fluid and pressurizes the fluid using a pressure booster.

16. The device of claim 11, wherein the core sample stress applicator applies pressure up to 12,000 psi on the core sample.

17. A system comprising:
a shaped charge testing chamber;
a core sample chamber positionable within the shaped charge testing chamber and sized to receive a core sample;
a core sample stress applicator to apply stress to the core sample;
a device comprising a hydraulic yoke that to maintain the core sample chamber in a testing position within the shaped charge testing chamber, wherein the hydraulic yoke comprises at least one hydraulic cylinder to provide pressure to maintain the core sample chamber in the testing position within the shaped charge testing chamber;
a loading and ejection piston in mechanical communication with the core sample chamber; and
an ejection mechanism adjacent to the shaped charge testing chamber to provide an ejecting force on the loading and ejection piston.

18. The system of claim 17, wherein the core sample chamber is removable from the shaped charge testing chamber.

19. The system of claim 17, wherein the core sample chamber comprises a rubber confining sleeve.

\* \* \* \* \*